United States Patent
Greenblatt et al.

(10) Patent No.: US 8,950,592 B1
(45) Date of Patent: Feb. 10, 2015

(54) ARTICULATABLE ELEVATED BICYCLE RACK

(75) Inventors: Joel Greenblatt, Minneapolis, MN (US); Hans Steege, Minneapolis, MN (US)

(73) Assignee: Everlast Climbing Industries, Inc., Chattanooga, TN (US)

( * ) Notice: Subject to any disclaimer, the term of this patent is extended or adjusted under 35 U.S.C. 154(b) by 665 days.

(21) Appl. No.: 12/706,276

(22) Filed: Feb. 16, 2010

Related U.S. Application Data

(60) Provisional application No. 61/152,796, filed on Feb. 16, 2009.

(51) Int. Cl.
*A47F 7/00* (2006.01)
*E05B 73/00* (2006.01)

(52) U.S. Cl.
USPC .................................. 211/17; 211/5

(58) Field of Classification Search
CPC .............. B62H 3/00; B62H 3/04; B62H 3/06; B62H 3/08; Y10S 224/924
USPC ............. 211/17, 18, 19, 20, 21, 22, 23, 24, 5, 211/1.57; 248/121, 127; 224/536, 537, 224/504–508, 281, 282, 510, 924
See application file for complete search history.

(56) References Cited

U.S. PATENT DOCUMENTS

| | | | | |
|---|---|---|---|---|
| 3,843,001 | A * | 10/1974 | Willis | 414/462 |
| 3,883,002 | A * | 5/1975 | Moore | 211/18 |
| 4,015,718 | A * | 4/1977 | Bernard | 211/5 |
| 4,126,228 | A * | 11/1978 | Bala et al. | 211/5 |
| 4,316,544 | A * | 2/1982 | Goldstein | 211/5 |
| 4,352,432 | A * | 10/1982 | Smith | 211/19 |
| 4,452,384 | A * | 6/1984 | Graber | 224/314 |
| 4,524,893 | A * | 6/1985 | Cole | 224/319 |
| 4,932,829 | A * | 6/1990 | Miller | 414/462 |
| 5,199,843 | A | 4/1993 | Sferra | |
| 5,449,074 | A | 9/1995 | Paulson et al. | |
| 5,474,189 | A * | 12/1995 | Peterson | 211/18 |
| 5,549,231 | A * | 8/1996 | Fletcher et al. | 224/536 |
| 5,567,103 | A * | 10/1996 | Konstant | 414/276 |
| 5,692,659 | A | 12/1997 | Reeves | |
| 5,702,007 | A * | 12/1997 | Fritz et al. | 211/17 |
| 5,730,345 | A | 3/1998 | Yeckley et al. | |
| 5,988,403 | A | 11/1999 | Robideau | |

(Continued)

FOREIGN PATENT DOCUMENTS

| | | |
|---|---|---|
| DE | 10013787 | 10/2001 |
| DE | 20211721 | 2/2003 |

(Continued)

OTHER PUBLICATIONS

Orion Bausysteme GmbH. "Orion Bausysteme GmbH official Velocity 2007 Mobility Partner," (2007) http://www.orion-bausysteme.de.

*Primary Examiner* — Patrick Hawn
(74) *Attorney, Agent, or Firm* — McAndrews, Held & Malloy, Ltd.

(57) ABSTRACT

An articulatable bicycle rack includes a rack arm that is coupled to a support structure in an elevated position. The rack further includes a bicycle support tray that is coupled to a shuttle that is movably engaged along a length of the rack arm. The bicycle support tray is articulatable about a pivot member that is coupled to the rack arm so as to selectively position the support tray between the storage position and a loading/unloading position.

20 Claims, 13 Drawing Sheets

(56) References Cited

U.S. PATENT DOCUMENTS

| | | | |
|---|---|---|---|
| 6,237,781 B1 | 5/2001 | Dahl | |
| 6,336,562 B1 * | 1/2002 | Mori | 211/20 |
| 6,419,096 B1 | 7/2002 | Shepherd | |
| 6,637,602 B2 | 10/2003 | Dueck | |
| 6,761,297 B1 * | 7/2004 | Pedrini | 224/519 |
| 6,877,613 B2 | 4/2005 | Bleazard | |
| 6,948,621 B1 | 9/2005 | Lassanske et al. | |
| 7,104,430 B2 | 9/2006 | Reeves | |
| D543,906 S | 6/2007 | Hoadley et al. | |
| 7,472,517 B2 * | 1/2009 | Blume | 52/79.1 |
| 7,481,027 B2 * | 1/2009 | Blume | 52/79.1 |
| 7,694,830 B1 * | 4/2010 | Larson | 211/20 |
| 7,784,622 B2 * | 8/2010 | Bernard | 211/20 |
| 7,922,009 B1 * | 4/2011 | Larson | 211/17 |
| 7,946,432 B1 * | 5/2011 | Swanson et al. | 211/20 |
| 2007/0107322 A1 | 5/2007 | Blume | |
| 2007/0221589 A1 * | 9/2007 | Bernard | 211/17 |
| 2008/0073395 A1 * | 3/2008 | Reeves et al. | 224/324 |

FOREIGN PATENT DOCUMENTS

| | | |
|---|---|---|
| DE | 20201863 | 6/2003 |
| DE | 202004009779 | 2/2005 |
| DE | 202006005800 | 8/2006 |
| EP | 1462348 | 9/2004 |
| JP | 7315269 | 12/1995 |
| JP | 11141164 | 5/1999 |

* cited by examiner

ARTICULATABLE ELEVATED BICYCLE RACK

CROSS REFERENCE TO RELATED APPLICATIONS

This application claims priority to U.S. Provisional Patent Application Ser. No. 61/152,796, filed on Feb. 16, 2009 and entitled "Articulatable Elevated Bicycle Rack," the content of which being incorporated herein in its entirety.

FIELD OF THE INVENTION

The present invention relates to bicycle rack systems generally, and more particularly to an elevated articulatable bicycle rack which facilitates the convenient storage of a bicycle in an elevated position. The bicycle rack of the present invention may be a free standing structure that is capable of storing a plurality of bicycles in a relatively compact space.

BACKGROUND OF THE INVENTION

Bicycle racks for temporarily storing bicycles are available in a wide variety of designs. Typically, bicycle racks are used as a location to temporarily position bicycles for parking, storage, display, and the like. In some cases, bicycle racks are configured to facilitate locking of the bicycles thereto, such as through the use of "u-locks", chain locks, chain and padlock combinations, and the like.

While bicycle racks have traditionally been used in places like parks, libraries, and other building entrances, the use of bicycles in densely populated areas has recently dramatically increased. In some cases, bicycles are being used as a primary mode of transportation in urban areas. As a result, a need has arisen to provide parking and/or temporary storage of bicycles in a higher density than what was previously available through conventional bicycle racks.

One solution to this need has been the development of multiple-level bicycle storage systems which facilitate bicycle storage in a substantially vertically stacked arrangement. As a result, a much greater number of bicycles may be stored in a given footprint area. A number of multiple level bicycle storage systems have been proposed. However, the systems proposed to date are often times difficult to operate, do not provide simple and efficient loading and unloading of bicycles, and/or assume a greater footprint than is necessary.

In view of the above, it is an object of the present invention to provide a bicycle rack that enables elevated bicycle storage while assuming a minimal operating footprint.

It is another object of the present invention to provide an elevated bicycle rack which facilitates simple loading and unloading of bicycles.

It is another object of the present invention to provide a multiple level bicycle storage rack which maximizes bicycle storage density while minimizing the required operating foot print area for the rack.

SUMMARY OF THE INVENTION

By means of the present invention, bicycles may be rapidly and easily stored in a relatively high density arrangement. The bicycle rack of the present invention provides elevated bicycle storage, wherein loading and unloading of such bicycles is facilitated by an articulatable portion of the bicycle rack. The bicycle rack of the present invention minimizes operating footprint requirements while maximizing storage density.

In one embodiment, the bicycle rack of the present invention includes a rack arm having first and second ends defining a length therebetween, wherein the first end is coupled to a support structure in a first orientation so that the rack arm is in an elevated position. The bicycle rack further includes a shuttle that is movably engaged along the length of the rack arm, a pivot member coupled to the rack arm, and a bicycle support tray that is coupled to the shuttle by a damping device. The tray is articulatable about the pivot member to facilitate loading and unloading of bicycles.

In some embodiments, the tray articulates about the pivot member while the shuttle is moved along the rack arm, and the tray may be articulatable up to about 90 degrees above the pivot member.

DETAILED DESCRIPTION OF THE PREFERRED EMBODIMENTS

The objects and advantages enumerated above together with other objects, features, and advances represented by the present invention now will be presented in terms of detailed embodiments described with reference to the attached drawing figures which are intended to be representative of various embodiments of the invention. Other embodiments and other aspects of the invention are recognized as being within the grasp of those having ordinary skill in the art.

Figure 1:
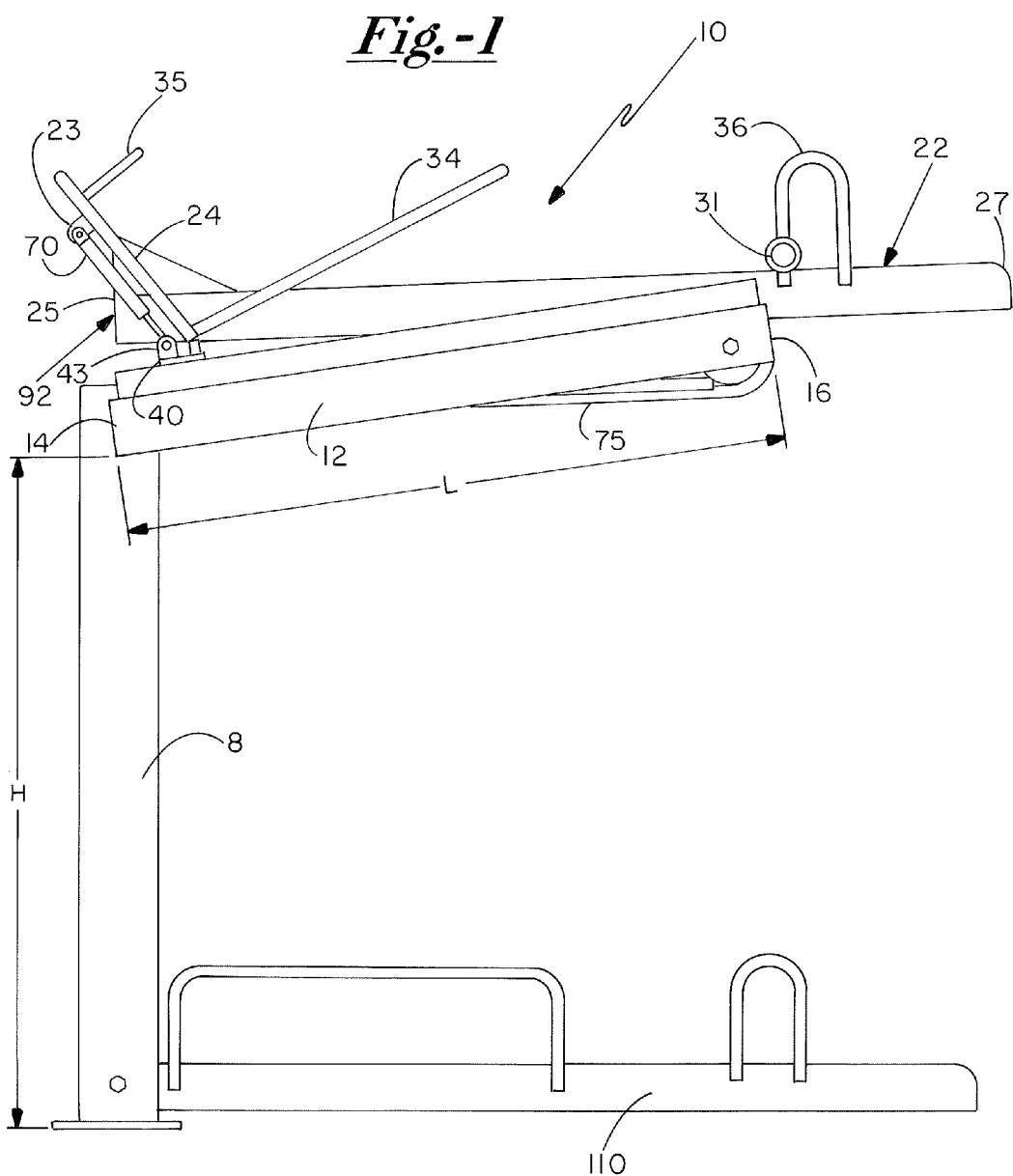
FIG. 1 is a side elevational view of a bicycle rack of the present invention.

With reference now to the drawing figures, and first to FIG. 1, a bicycle rack 10 of the present invention includes a first rack arm 12 having first and second ends 14, 16 defining a length "L" therebetween. First end 14 may be coupled to a support structure 8, which may be in the form of, for example, a rack stand that is secured to a ground surface. In other embodiments, however, support structure 8 may be a wall or other structure that is capable of supporting first rack arm 12 in an elevated position, such as that illustrated in FIG. 1.

Figure 2:
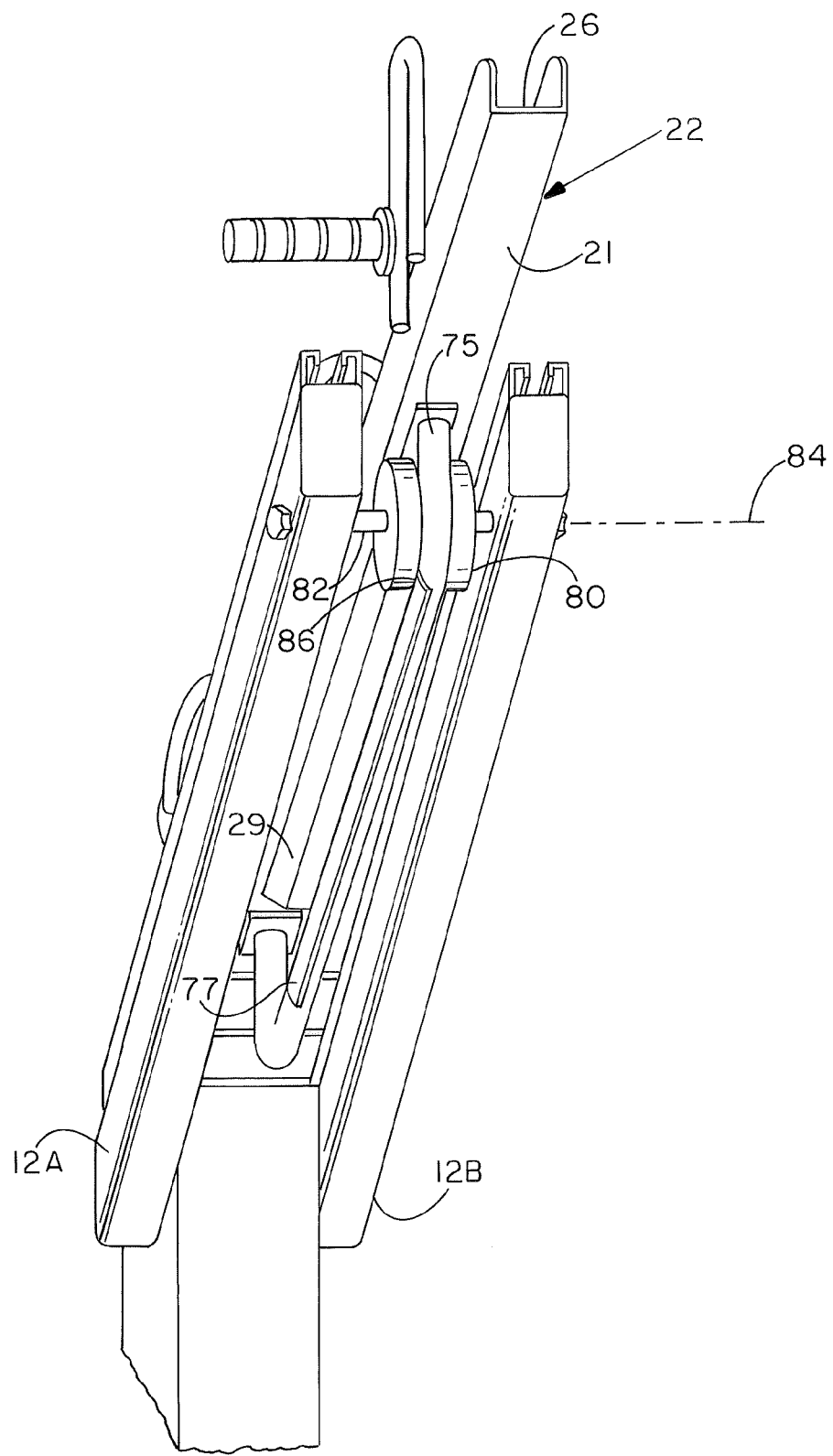
FIG. 2 is a perspective view of a portion of the bicycle rack illustrated in FIG. 1.
Figure 3:
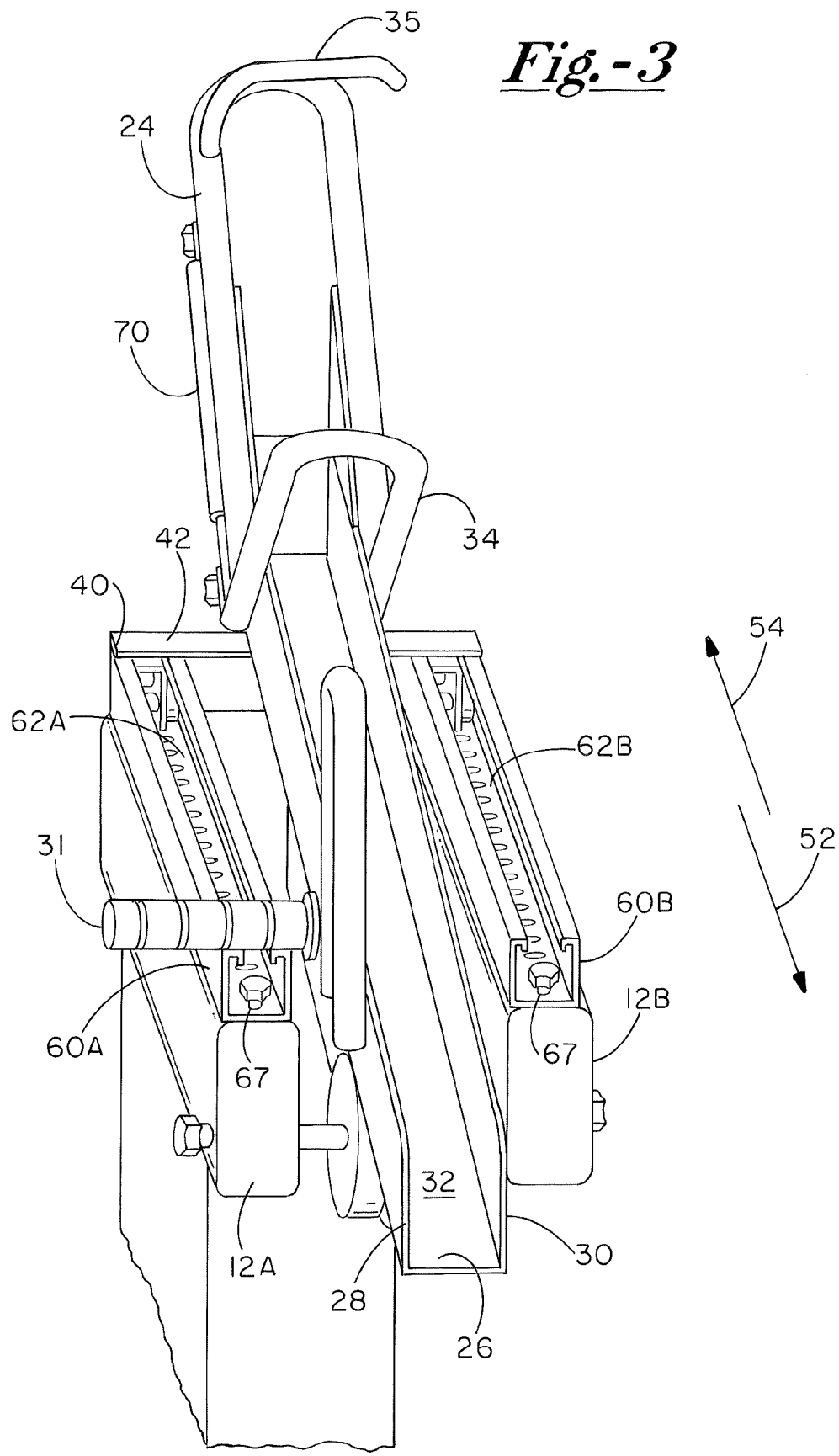
FIG. 3 is a perspective view of a portion of the bicycle rack illustrated in FIGS. 1 and 2.

In one embodiment, first rack arm 12 is oriented such that first end 14 is lower than second end 16, wherein first rack arm 12 is angularly oriented with respect to a horizontal ground surface. Such an orientation may be utilized to assist in the bicycle storage procedure, as described in greater detail hereinbelow. In one embodiment, as illustrated in FIG. 2, first rack arm 12 may comprise first and second struts 12A, 12B, which together function to support bicycle support tray 22. It is contemplated, however, that first rack arm 12 may comprise one or more bodies secured to support structure 8 in any orientation suitable for supporting bicycle support tray 22. First rack arm 12 may be secured to support structure 8 by welding, fasteners, or other securing means which are capable of maintaining first rack arm 12 in a secure cantilevered condition under the weight of, for example, a stored bicycle.

Figure 4:
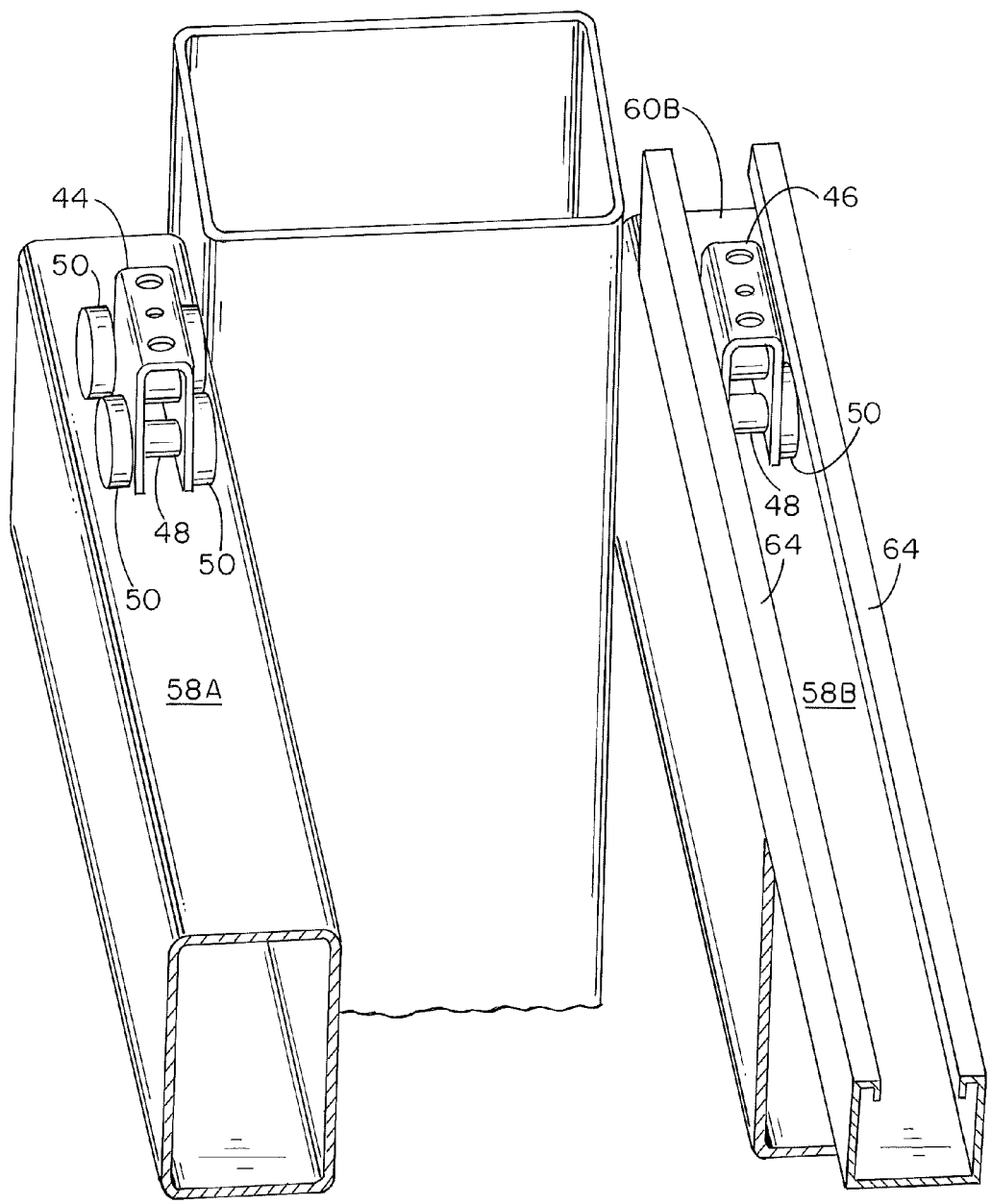
FIG. 4 is an isolation partial cutaway view of a portion of the bicycle rack illustrated in FIGS. 1-3.

Bicycle rack 10 further includes a shuttle 40 that is movably engaged along at least a portion of length "L" of first rack arm 12. In the illustrated embodiment, shuttle 40 includes a brace portion 42 and first and second support brackets 44, 46 (as shown in the isolation partial cutaway view of FIG. 4). First and second support brackets 44, 46 may each include one or more transaxles 48 to which may be mounted wheels 50. Wheels 50 may roll, slide, or otherwise be motivated along first rack arm 12, such as along respective surfaces 58A, 58B of shuttle tracks 60A, 60B. Moreover, wheels 50 may be retained within respective channels 62A, 62B of first and second shuttle tracks 60A, 60B by respective lips 64 of shuttle tracks 60A, 60B. In this manner, first and second support brackets 44, 46 may be movably engaged along first rack arm 12 within respective shuttle tracks 60A, 60B.

In some embodiments, shuttle tracks 60A, 60B comprise separate elements which are secured to first and second struts 12A, 12B by welding, fasteners, or the like. In other embodiments, however, first and second struts 12A, 12B may be configured to define shuttle tracks 60A, 60B in an integral fashion. Therefore, shuttle tracks 60A, 60B merely refer to the structure or mechanism which defines channels 62A, 62B in which first and second support brackets 44, 46 of shuttle 40 are movably retained. For example, shuttle tracks 60A, 60B may be merely a pathway along which shuttle 40 may be motivated. Thus, shuttle tracks 60A, 60B may be one or more paths which enable operable movable coupling between shuttle 40 and first rack arm 12. Such paths may provide magnetic or other means for coupling shuttle 40 to first rack arm 12 in place of, or in addition to, the structure described above.

As a consequence of the arrangement described above, as well as those conceivable by those of ordinary skill in the art, shuttle 40 may be moved along first and second directions 52, 54 while in engagement with first rack arm 12. Shuttle 40 serves as a mechanism for movably coupling support tray 22 to first rack arm 12. Support tray 22 may be coupled to shuttle 40 by a hinge device 41 connected to brace 42. In a particular embodiment, hinge device 41 may include a first bracket 41a welded or otherwise secured to brace 42, and a second bracket 41b welded or otherwise secured to support tray 22. Hinge brackets 41a, 41b of hinge 41 pivot with respect to one another about hinge axis 41c, which may be in the form of a bolt, pin, or other structure about which hinge brackets 41a, 41b may operably pivot. In other embodiments, first hinge bracket 41a may itself constitute brace 42 of shuttle 40, wherein first hinge bracket 41a is itself secured to first and second support brackets 44, 46 or shuttle 40. Such securement may be accomplished through welding, fasteners, or other mechanisms understood by those of ordinary skill in the art.

In one embodiment, second hinge bracket 41b is secured to a lower surface 21 of support tray 22 at a location that is spaced from first end 25. In one embodiment, such spacing may be between 0 and 20 inches from first end 25, and is more preferably between about 2 and 10 inches from first end 25 of support tray 22. In one aspect, securing second hinge bracket 41b to support tray 22 at a location spaced from first end 25 results in a lever action for assisting in the rotation of support tray 22 about hinge axis 41c, as well as acting to motivate shuttle 40 along direction 54 when support tray 22 is being pivoted from a loading/unloading position 94 to a storage position 92. Applicants contemplate, however, that support tray 22 may be secured to shuttle 40 at a variety of locations along support tray 22.

The use of a hinge device 41 promotes a stable and secure pivoting relationship between support tray 22 and first rack arm 12 about hinge axis 41c. Such pivotal securement further provides a stable platform for damper 70, and specifically to inhibit relative translational movement as between support tray 22 and shuttle 40. As described in greater detail hereinbelow, shuttle 40 further acts as an anchor location for a damper 70 for controllable pivoting of support tray 22 about axis 84, and shuttle 40 further facilitates a relatively steep pivot angle of support tray 22 when pivoted into the loading/unlading position 94, and further as a consequence of securement between hinge device 41 and support tray 22 at a location relatively adjacent to first end 25 of support tray 22.

Figure 5:
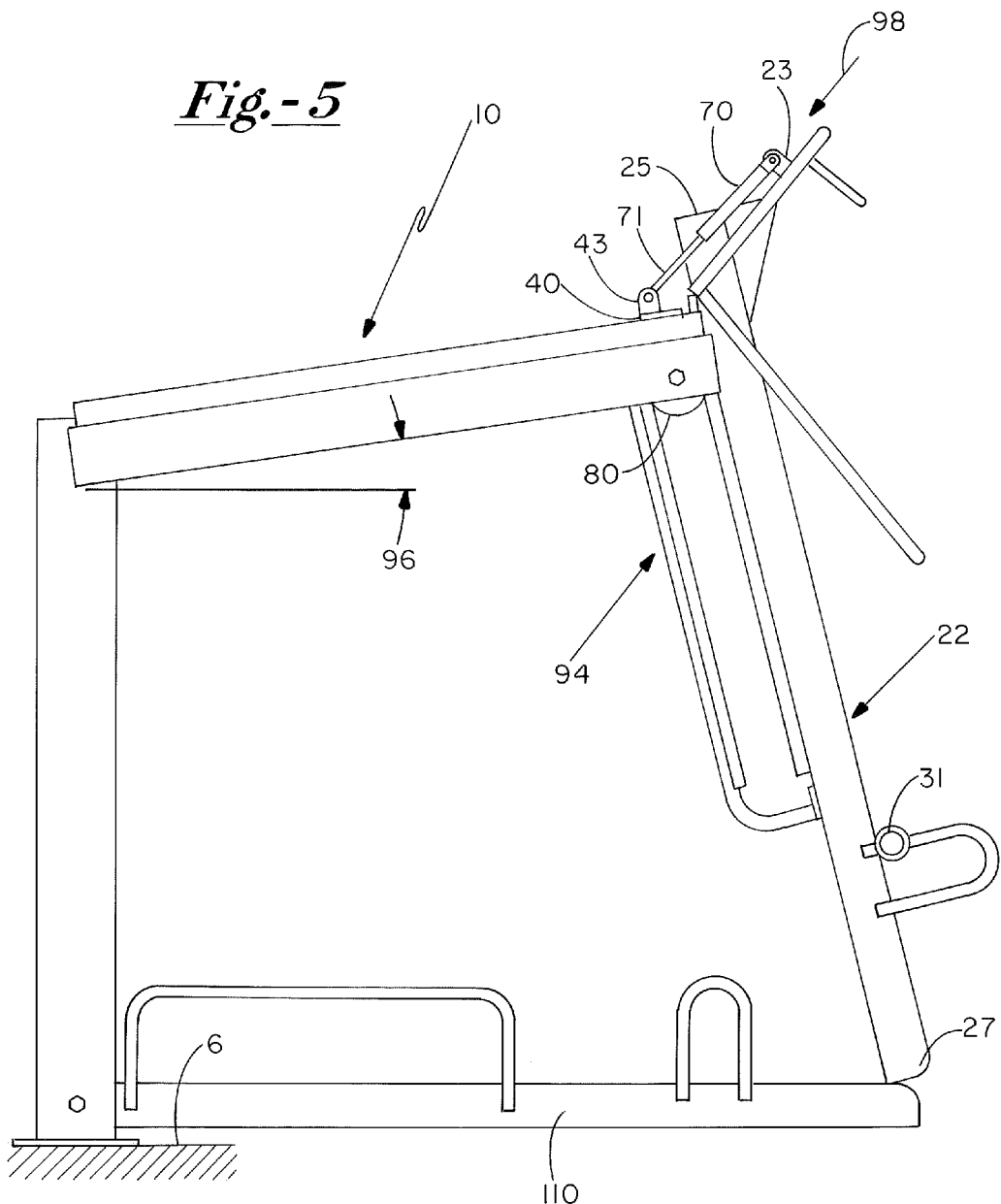
FIG. 5 is a side elevational view of the bicycle rack illustrated in FIGS. 1-4.

As illustrated in FIG. 5, support tray 22 may also be secured to shuttle 40 by damper 70, which may be coupled between first connector bracket 43 of shuttle 40 and second connector bracket 23 of support tray 22. In one embodiment, second connector bracket 23 is connected to, or extends from, a first bicycle stabilizer structure 24 coupled to support tray 22. Damper 70, for example, may be a Guden gas damper GDE52-J with a 4 inch stroke and a total extension of 12.5 inches. Gas dampers provide a controlled and substantially constant force, are self contained, and require little or no maintenance.

Second connector bracket 23, in some embodiments, is positioned at or near first end 25 of support tray 22. Moreover, second connector bracket 23 may be positioned such that damper 70 remains in an orientation that is angled upwardly from horizontal when support tray 22 is pivoted to a loading/unloading position 94. Such orientation is illustrated in FIG. 5.

Bicycle support tray 22 may be specifically configured to operably receive at least a portion of a conventional bicycle. In one embodiment, bicycle support tray 22 includes a base 26 and opposed side walls 28, 30 which together define a channel 32 that is configured to operably receive a portion of the wheels (and tires) of a conventional bicycle. In one embodiment, therefore, the width of channel 32 may be between about 2 and 3 inches, and the length of channel 32 may be between about 55 and 65 inches, such that both wheels of a conventional adult bicycle may simultaneously rest within channel 32 of bicycle support tray 22.

Support tray 22 may further include one or more bicycle stabilizer structures, such as structures 24, 34. Such bicycle stabilizer structures 24, 34 may be provided at support tray 22 to further stably support a conventional bicycle at support tray 22. For example, stabilizer structures 24, 34 may include structure extending from adjacent to side walls 28, 30 of support tray 22 to facilitate support at opposing sides of a front bicycle wheel, and to assist in preventing a bicycle from undesirably disengaging from support tray 22. In some embodiments, stabilizer support structures 24, 34 may extend above respective sidewalls 28, 30 of support tray 22 by a height dimension of between about 4 and 18 inches. Applicants have determined that such dimensions for stabilizer structures 24, 34 provide adequate stabilization to bicycles mounted at rack 10. Structures 36 may also or alternatively provide a location for a mounting handle 31 to support tray 22 and/or for locking a bicycle to support tray 22. Such a handle 31 assists the user in moving support tray 22 with respect to first rack arm 12.

In some embodiments, a latch hook 35 may be provided at support tray 22 for selectively engaging and retaining a bicycle at support tray 22. Latch hook 35 may be selectively engaged with, for example, a front wheel of a bicycle at support tray 22. When so engaged, latch hook 35 prevents the bicycle from moving along direction 52.

As best illustrated in FIG. 2, bicycle rack 10 further includes a pivot member 80 that is coupled to first rack arm 12. In one embodiment, pivot member 80 may be a wheel that is rotatably coupled to first rack arm 12 by a spindle 82, wherein pivot member 80 rotates about an axis 84 defined by spindle 82. Spindle 82 may, for example, comprise a bolt secured to first rack arm 12, wherein pivot member 80 is rotatable with respect thereto. In the illustrated embodiment, spindle 82 is fixedly secured between first and second struts 12A, 12B, with pivot member 80 being disposed between first and second struts 12A, 12B, and rotatably coupled to spindle 82.

In other embodiments, however, pivot member 80 may be in a fixed position, wherein bicycle support tray 22 merely slidably engages therewith. Consequently, it is contemplated by the present invention that pivot member 80 may or may not rotate in connection with the articulation of support tray 22 thereabout. A rotational capability of pivot member 80, however, may facilitate ease of articulation of support tray 22 about axis 84 defined by spindle 82. It is further contemplated that pivot member 80 may take on a variety of configurations, with its primary purpose being to support and guide bicycle support tray 22 in its articulation with respect to first rack arm 12. Thus, pivot member 80 may comprise one or more bodies which are configured and arranged to facilitate movement of support tray 22 between a storage position 92 and a loading/unloading position 94. In one embodiment, such movement may be about an axis, such as axis 84.

In one embodiment, support tray 22 may include a substantially v-shaped track 29 extending along a lower surface 21 of support tray 22. Such track 29 may be operably engagable with a coordinating channel 86 in pivot member 80. Such coordination may assist in guiding support tray 22 along a relatively straight path in its movement along directions 52, 54 with respect to first rack arm 12. Other configurations and mechanisms for guiding support tray 22 along its path of travel, however, are also contemplated as being useful in the present invention.

For example, support tray 22 may include a bracket 75 extending from lower surface 21 of support tray 22. Bracket 75 may be configured for operable engagement with pivot member 80 during the articulation of support tray 22 about pivot member 80. In the illustrated embodiment, bracket 75 includes a substantially v-shaped portion 77, which may operably engage with coordinating channel 86 of pivot member 80. In some embodiments, support tray 22 may include both bracket 75 and v-shaped track 29 for operably engaging pivot member 80 at substantially opposed tangential surfaces of pivot member 80.

The operable articulation of support tray 22 about pivot member 80 is best illustrated by comparing FIGS. 1 and 5, wherein support tray 22 moves from a storage position 92 in FIG. 1 to a loading/unloading position 94 in FIG. 5. In the progression from storage position 92 to loading/unloading position 94, support tray 22 is articulated about pivot member 80, and pivot axis 84, through gravitational forces acting upon the cantilevered second end 27 of support tray 22. In particular, pivot member 80 acts as a fulcrum for balancing support tray 22. As support tray 22, along with shuttle 40, are moved along direction 52, the fulcrum position on support tray 22 shifts toward first end 25 thereof. Eventually, the amount of weight of the portion of support tray 22 outboard of the fulcrum defined by pivot member 80 exceeds the weight of support tray 22 inboard (or proximate first end 25) of the fulcrum point defined by pivot member 80. Such imbalance causes second end 27 of support tray 22 to descend toward the ground surface. The speed of descent of second end 27 under the force of gravity is mitigated by the damping force exhibited by damper 70 along vector 98. The damping force provided by damper 70 may be tuned to be suitable for the specific characteristics of rack 10, including the weight of support tray 22, the relative positions of first connector bracket 43, second connector bracket 23, and axis 84 when support tray 22 is in loading/unloading position 94, and so on, in order to provide a desired descent rate and force for second end 27 of support tray 22. In one embodiment, damper 70 provides up to 100 lbs of resistance force along its piston axis 71, and which may be manifested in vector 98.

In one embodiment, motion is translated to support tray 22 and shuttle 40 by a user applying force to a respective handle 31, or to other portions of support tray 22. The range of motion of shuttle 40 along first rack arm 12 may be limited by stops 67 positioned at respective channels 32 of first and second shuttle tracks 60A, 60B. Stops 67 may be located at or adjacent to ends of shuttle tracks 60A, 60B corresponding to first and second ends 14, 16 of first rack arm 12. Such limitation on movement along directions 52, 54 of shuttle 40 correspondingly limits the extent of movement of support tray 22 and articulation of support tray 22 about pivot member 80. Stops 67 may comprise plugs, bolts, or other structures which impede travel of first and second support brackets 44, 46 within and along shuttle tracks 60A, 60B. As such, shuttle 40 is allowed to travel only along a distance defined between respective stops 67 in a respective shuttle track 60A, 60B.

The extent of articulation of support tray 22 about pivot member 80 may be defined by a number of factors, including, for example, the positions of stops 67 with respect to pivot axis 84, the maximum degree of extension of damper 70 along damper axis 71, the relationship of the total length of support tray 22 to the height of second end 16 of first rack arm 12 above a ground surface, and so on. In some embodiments, support tray 22 may be articulatable up to about 80 degrees about pivot member 80. Such extent of articulation is accomplished by positioning stops 67 proximate to pivot axis 84, such that shuttle 40, and first end 25 of support tray 22 are able to travel along direction 52 up to a position close to pivot axis 84. In one embodiment, pivot member 80 may be disposed at second end 16 of first rack arm 12.

In some embodiments of the present invention, a relatively large extent of articulation of support tray 22 about pivot member 80 is desired in order to minimize the operating foot print area of bicycle rack 10. In particular, one arrangement of the present invention enables support tray 22 to be positioned in a relatively steeply angled orientation when in loading/unloading position 94. In some cases, such an angle may be 70 degrees or more from a horizontal ground surface. Such a steeply angled orientation for support tray 22 in loading/unloading position 94 minimizes the distance between second end 27 and support structure 8 when support tray 22 is in loading/unloading position 94. The minimization of such distance consequently minimizes the total area assumed in the operation of bicycle rack 10 (foot print). Operating foot print minimization may be particularly useful in congested areas such as sidewalks, subway stations, indoor rooms, and the like.

Figure 6:
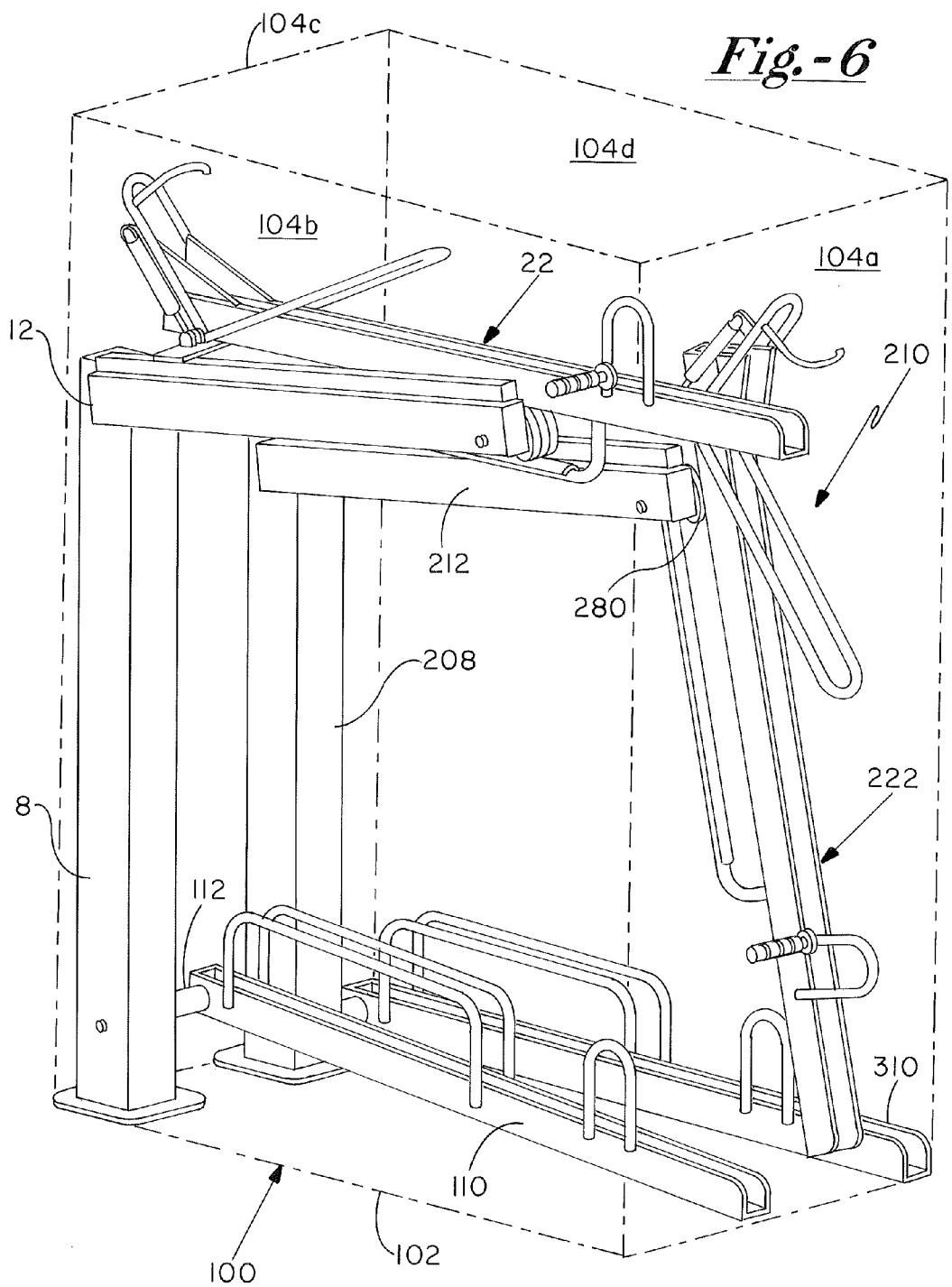
FIG. 6 is a perspective view of a bicycle rack of the present invention.
Figure 7:
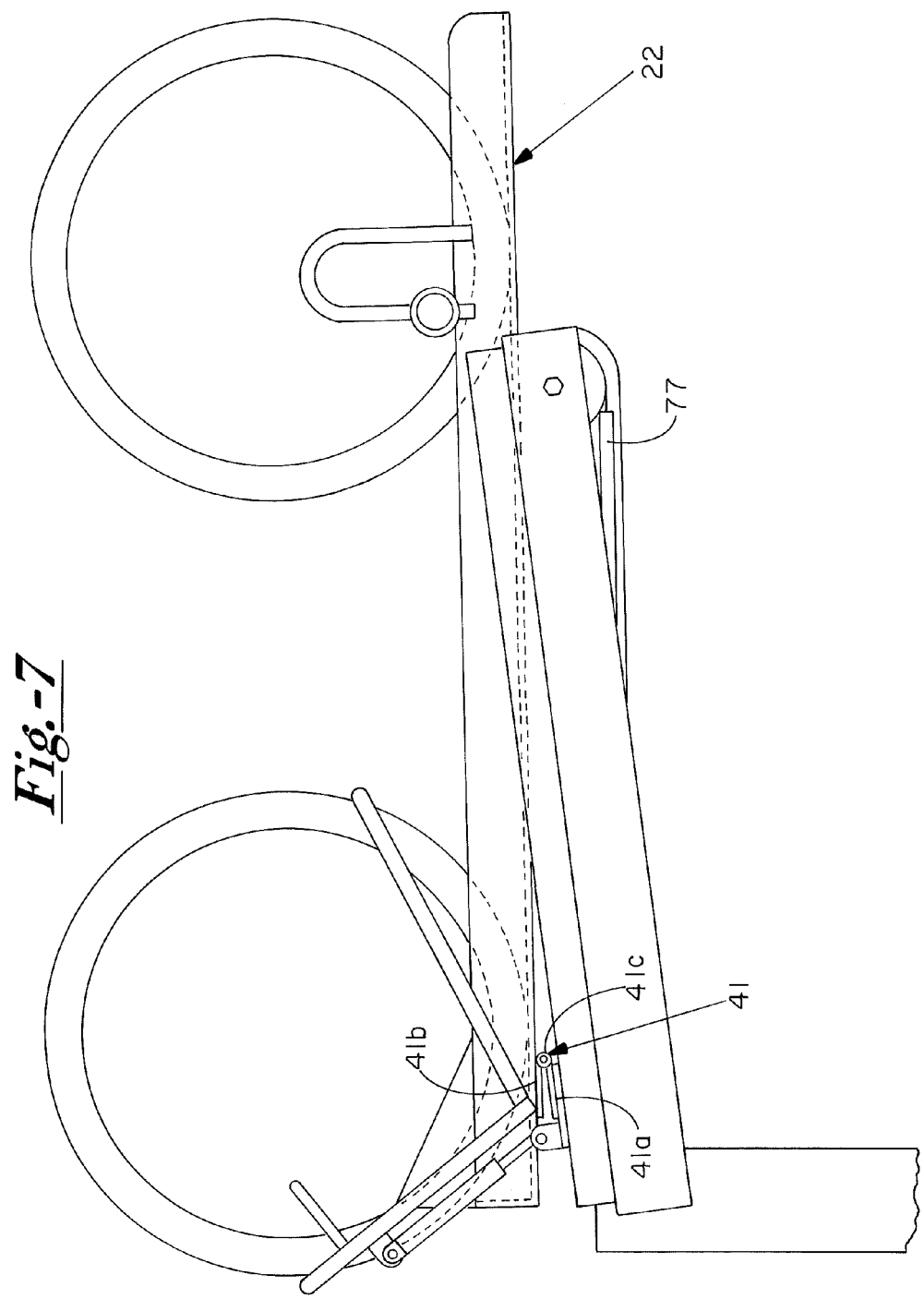
FIG. 7 is a schematic view of wheels of a bicycle being stored at a bicycle rack of the present invention in its storage position.

An example foot print 100 of the present invention is illustrated in FIG. 6, wherein foot print 100 defines an area on the ground or floor surface that is assumed by the bicycle rack, such as bicycle rack 210. Footprint 100 may be defined as the area within an endless enclosure line 102 on the ground or floor surface at or adjacent to which the bicycle rack is located. Enclosure line 102 is a perimeter line defined by respective planes forming a four-sided parallelogram with four 90° corners and extending substantially perpendicular to the ground or floor surface at respective outermost tangential points of the bicycle rack on each planar side 104a-104d. The arrangement of the present invention minimizes foot print 100, while maximizing bicycle storage density. In one embodiment, the bicycle rack of the present invention may contain at least about 0.4 support racks per m². Another metric useful in understanding the minimal foot print 100 is that a typical bicycle rack of the present invention has a foot print of about 1.7 m².

The relatively steep angle orientation of support tray 22 in loading/unloading position 94 also facilitates the loading and unloading procedure. For example, a user is able to position the respective bicycle in a nearly vertical orientation and load it onto support tray 22 while the user is positioned proximate to support tray 22. In this fashion, the user is able to easily reach latch hook 35 while maintaining a grasp on the bicycle in a mounting position.

As indicated above, first rack arm 12 may be elevated above a ground surface to provide elevated storage of, for example, bicycles. First rack arm 12 may be mounted in an orientation such that first end 14 is below second end 16, relative to the horizontal ground surface. Such an arrangement may assist in reducing the force required to move support tray 22 from loading/unloading position 94 to storage position 92, as well as to assist in retaining support tray 22 in storage position 92 without separate locking systems or features. These attributes are accomplished through the gravitational force acting upon support tray 22 through shuttle 40, wherein shuttle 40 is under constant gravitational urging toward first end 14 of first rack arm 12. In some embodiments, angle 96 may be between about 1 and 10 degrees.

In some embodiments, first rack arm 12 may be elevated by a height sufficient to allow storage of additional bicycles thereunder. In the illustrated embodiment, for example, a second support tray 110 is secured to support structure 8 at or adjacent to ground surface 6. Consequently, a minimum height "H" of first rack arm 12 may be, for example, between about 42 and 46 inches. Other arrangements and configurations, however, for first rack arm 12 and second support tray 110 are contemplated by the present invention. In one embodiment, second support tray 110 may be horizontally offset from support tray 22 with a spacer 112 disposed between second support tray 110 and support structure 8. Such horizontal offset minimizes the likelihood of encumbrance of a bicycle stored at second support tray 110 with the operation of support tray 22. In particular, such offset enables support tray 22 to move into its loading/unloading position 94 without interference by second support tray 110, or by a bicycle stored thereat.

A further embodiment of the present invention is illustrated in FIG. 6, wherein bicycle rack 210 includes a second rack arm 212 coupled to a second support structure 208 in a second orientation that is substantially parallel to a first orientation described above for first rack arm 12. Second rack arm 212 supports a second bicycle support tray 222 that is articulatable about a second pivot member 280 that is coupled to second rack arm 212 in a fashion similar to that described above with respect to pivot member 80 and first rack arm 12. Second rack arm 212 may be vertically offset from first rack arm 12 so as to minimize the likelihood of interference between bicycles stored at respective support trays 22, 222. Moreover, rack 210 may include additional support trays 110, 310 at or near ground surface 6 for additional storage of bicycles at rack 210.

Figure 8:
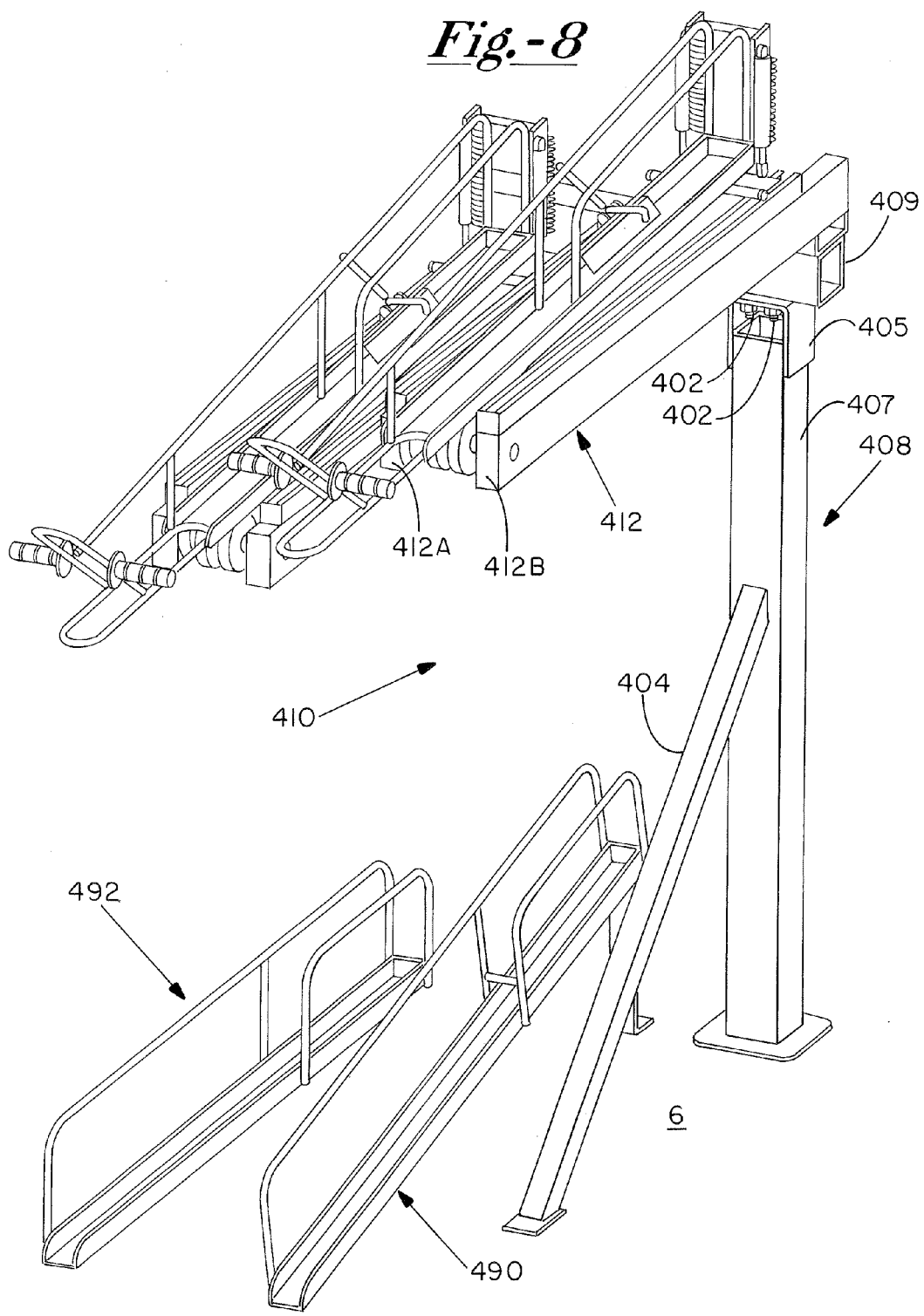
FIG. 8 is a perspective view of a bicycle rack of the present invention.

Another embodiment of the invention is illustrated beginning at FIG. 8, wherein bicycle rack 410 includes at least one rack arm 412 coupled to a support structure 408 in a position elevated above a ground or floor surface 6 by a height dimension "H" that is selected for the intended application, and which may be of a sufficient magnitude to facilitate storage of objects thereunder, including bicycles which may be stored at one or more secondary support trays 490, 492 secured to the ground or floor surface 6. In one embodiment, rack arm 412 may include first and second struts 412A, 412B which together support bicycle support tray 422. As described above, however, rack arm 412 may comprise one or more bodies that are arranged to movably support bicycle support tray 422 in one or more selected elevated positions. Rack arm 412 may be secured to support structure 408 in any desired manner that facilitates the functionality of bicycle rack 410 described herein. In the illustrated embodiment, rack arm 412 is welded, fastened, or otherwise secured to a cross bar 409 that is itself welded, fastened, or otherwise secured to upright 407 of support structure 408. For example, cross bar 409 may be fastened to a connector brace 405 by, for example, bolts 402, and brace 405 may be welded or otherwise secured to upright 407. In some embodiments, a stabilizer 404 may be secured to upright 407 to further stabilize support structure 408.

Rack arm 412 includes a shuttle 440 that is movably engaged along at least a portion of length "L" of rack arm 412, as described above. In one embodiment, shuttle 440 is movable from a first location 494 adjacent to first end of rack arm 412 to a second position 496 adjacent to second end of rack arm 412. In such an embodiment, shuttle 440 is capable of travel along substantially an entire length "L" of rack arm 412.

Figure 9:
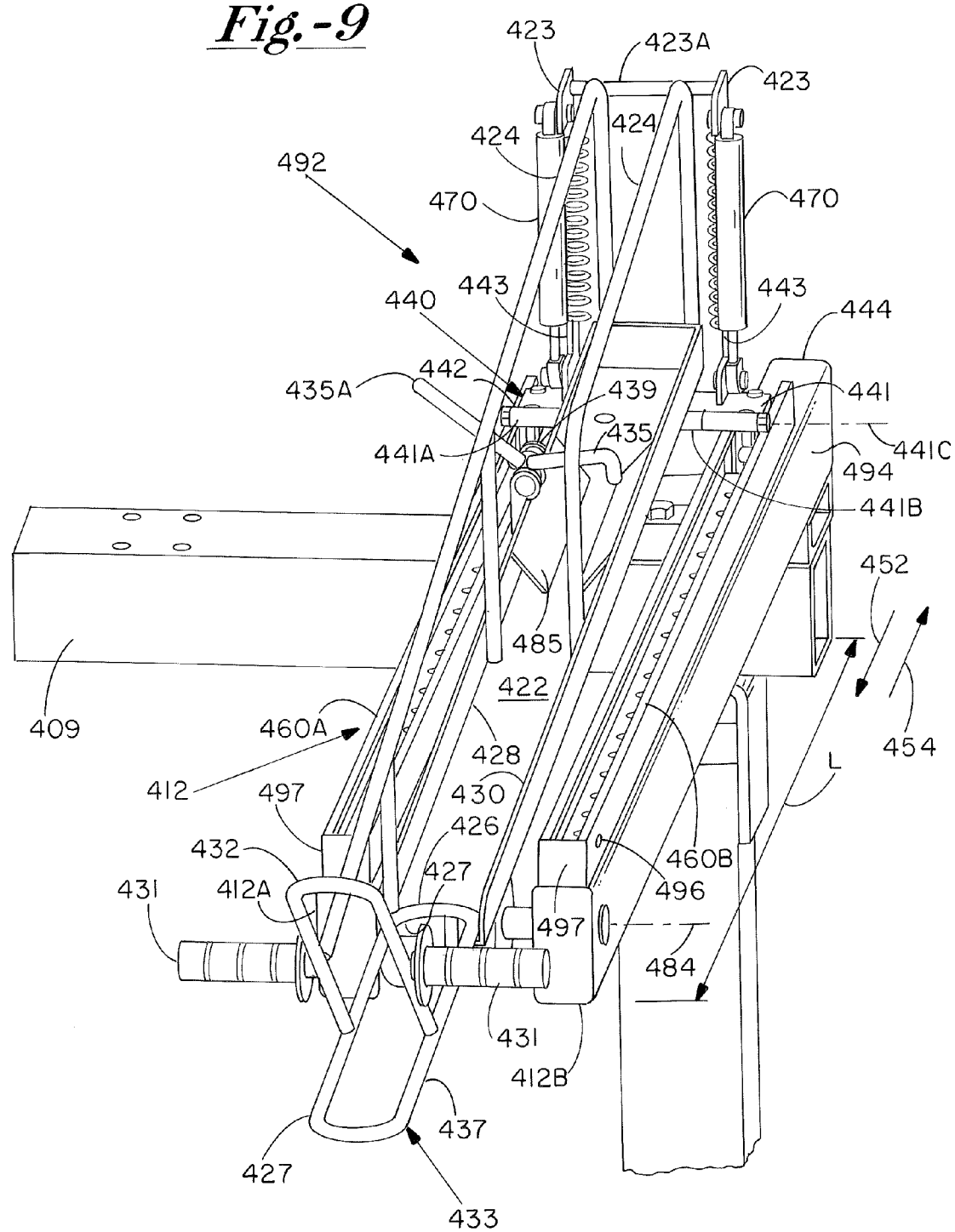
FIG. 9 is a detailed perspective view of a portion of the bicycle rack illustrated in FIG. 8.

As can be seen in the illustration in FIG. 9, a basic operation of bicycle support tray 422 in relation to rack arm 412 bears similarity to that described in the embodiments referenced in FIGS. 1-6. For example, shuttle 440 includes a brace portion 442 which may be in the form of a hinge device 441 having a hinge axis 441c defined by a pin, rod, or other structure about which hinge 441 may operably pivot.

Shuttle 440 is operably movable along, for example, shuttle tracks 460A, 460B in a manner such as that described above with respect to shuttle 40. In one embodiment, bicycle support tray 422 may be secured to hinge device 441 through welding, fasteners, or the like. In securing bicycle support tray 422 to hinge device 441, a first hinge bracket (not shown) is secured to first and second support brackets 444, 446, while a second hinge bracket (not shown) is secured to, for example, a lower surface 421 of support tray 422. In such a manner, bicycle support tray 422 is hingedly secure to shuttle 440 about hinge axis 441c.

Bicycle rack 410 may further include one or more dampers 470, which may be coupled between first connector bracket 443 and second connector bracket 423. First connector bracket 443 may be secured to shuttle 440 through known means, including welding, fasteners, and the like, and dampers 470 may be secured to first connector bracket 443 through, for example, respective fasteners. Second connector bracket 423 may, in one embodiment, be connected to a first bicycle stabilizer structure 424 that may be coupled to bicycle support tray 422 through welding, fasteners, or the like at one or more locations of bicycle support tray 422. In the embodiment illustrated in FIG. 8, for example, a cross beam 423A may be welded to respective portions of first bicycle stabilizer structure 424. In such a manner, one or more dampers 470 form a coupling between shuttle 440 and bicycle support tray 422. Second connector bracket 423 may be positioned in proximity to first end of bicycle support tray 422 such that damper 470 remains in an orientation that is angled upwardly from horizontal when support tray 422 is pivoted to a loading/unlading position.

Figure 10:
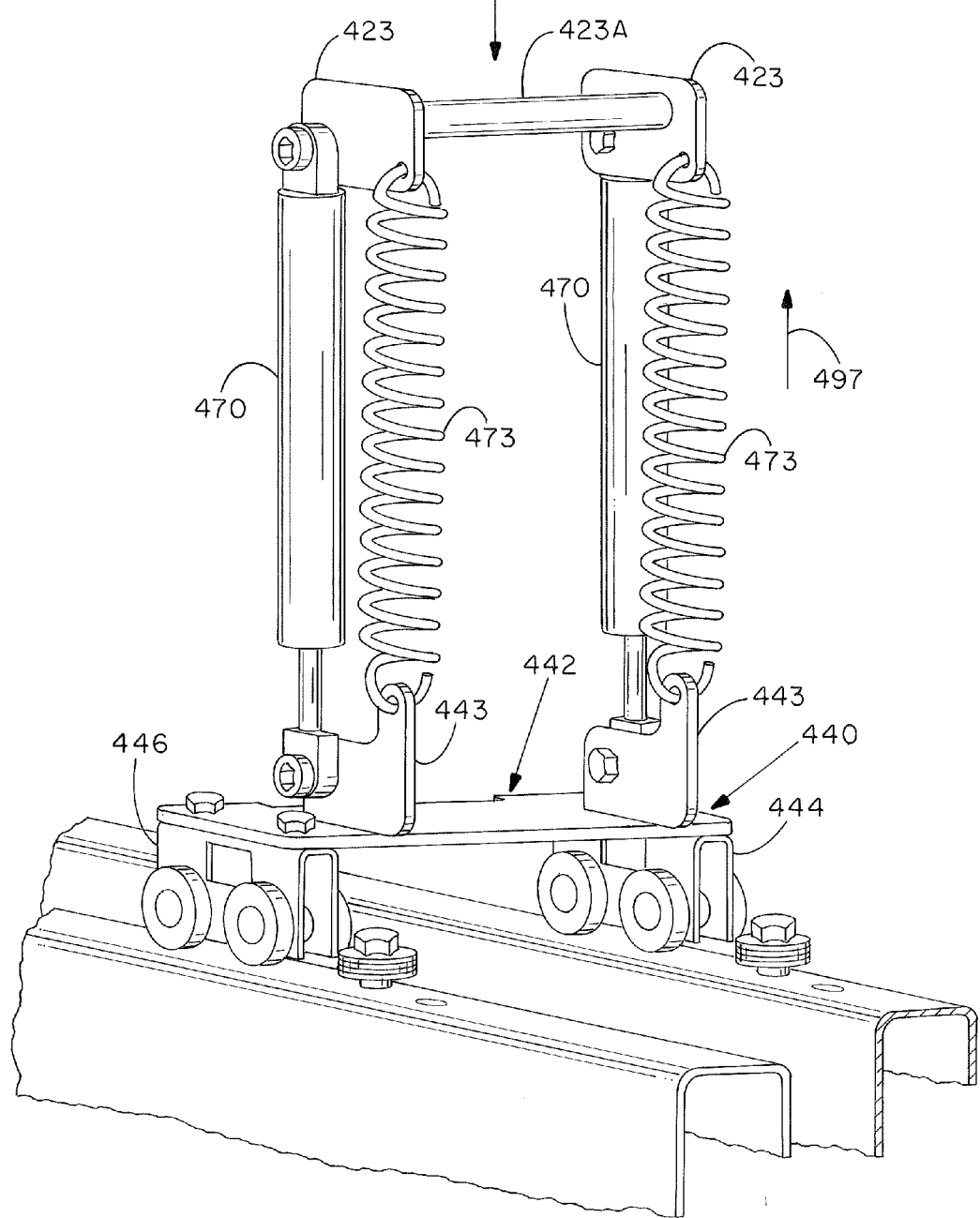
FIG. 10 is a detailed perspective view of a portion of the bicycle rack illustrated in FIGS. 8 and 9.

FIG. 10 represents an isolation view of a portion of bicycle rack 410 to more clearly illustrate the arrangement of shuttle 440 and example damping devices for reducing the rate of decent of second end 427 of bicycle support tray 422 when moving from a storage position to a loading/unloading position, and for reducing the force necessary to move support tray 422 from a loading/unloading position to a storage position. The illustration of FIG. 10 does not depict all structure of, for example, shuttle 440, but is intended rather to illustrate core components of bicycle rack 410. In one embodiment, one or more springs 473 may be used in replacement of, or in addition to, dampers 470 as useful damping devices. Springs 473 are preferably tension springs with a resistance to expansion along a direction parallel to direction 497. As a result, springs 473 act to generate a force along vector 498 to resist pivotal motion of bicycle support tray 422 about, for example, axis 441c and/or axis 484. In the illustrated embodiment, springs 473 are coupled between first connector bracket 443 of shuttle 440 and second connector bracket 423 coupled to first bicycle stabilizer structure 424. Other arrangements and locations for one or more springs 473, however, are contemplated by the present invention as being possible for assisting in the functions described above. Embodiments utilizing dampers 470 and/or springs 473 coupled to shuttle 440 enable the damping devices generating force vector 498 to travel with bicycle support tray 422 along rack arm 412. In doing so, vector 498 remains in a mostly vertical orientation along a majority of the travel of shuttle 440, thereby minimizing the necessary extension of dampers 470 and/or springs 473. Such an effect enables the use of relatively compact damping structures, and further may facilitate maximum performance efficiency of dampers 470 and/or springs 473. Only as shuttle 440 approaches second end of rack arm 412 does vector 498 significantly shift from a substantially vertical orientation to an orientation that nonetheless remains angled upwardly from horizontal. Applicant has determined that such characteristics are important to the desired performance of the bicycle racks of the present invention, and significantly simplifies construction thereof.

In one embodiment, springs 473 have an initial tension force of 10 pounds, and an overall tension force of about 7.5 pounds acting to force vector 498. Other spring sizes and tension forces, however, for springs 473 may be used in the present invention.

Figure 11:
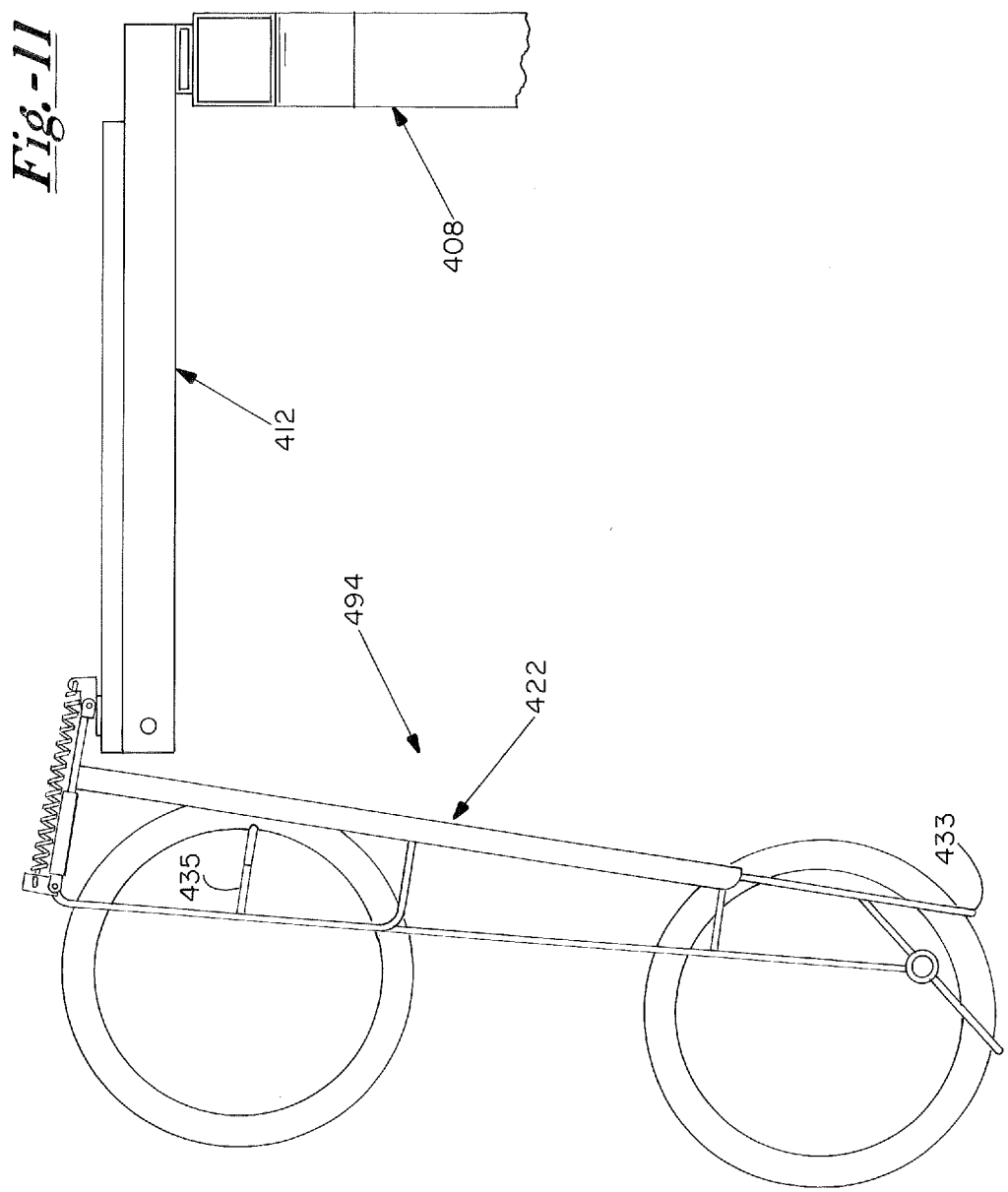
FIG. 11 is a schematic view of a bicycle positioned in a bicycle rack of the present invention in a loading/unloading position.

With reference back to FIG. 9, bicycle support tray 422 may include a variety of features to stabilize a bicycle stored thereat by stabilizing and securing the bicycle wheels to bicycle support tray 422. For example, support tray 422 may include bicycle stabilizer structures, such as first and stabilizer structures 424. Such stabilizer structures 424, for example, may include a structure extending from adjacent to sidewalls 428, 430 of support tray 422, and may also provide a convenient location for one or more handles 431. In the illustrated embodiment, support structures 424 and 437 together define a wheel brace portion 433 of support tray 422. Accordingly, an object, such as a bicycle wheel, may be supported at one or more locations within wheel support portion 433. An example of support tray 422 in operation is illustrated in FIG. 11, wherein support tray 422 is illustrated in a loading/unloading position 494.

In the illustrated embodiment, a latch hook 435 is provided at support tray 422 for selectively engaging and retaining a bicycle at support tray 422. Latch hook 435 may be selectively engaged with, for example, a front wheel of a bicycle, such as is illustrated in FIG. 11. Latch hook 435 may be actuated by handle 435A against a torsion spring 439 which urges latch hook 435 toward base 426 of support tray 422. In such a manner, latch hook 435 remains engaged to a respective bicycle wheel through the urging or torsion spring 439 in the absence of pressure applied to handle 435A. To release latch hook 435 from engagement with a respective bicycle wheel, therefore, handle 435A is actuated against torsion spring 439, to thereby rotate latch handle 435 away from base 426 of support tray 422.

As further illustrated in FIG. 9, a wheel wedge 485 may be provided at bicycle support tray 422. Wheel wedge 485 may be formed by, for example, one or more plates oriented at an angle with respect to first and/or second side walls 428, 430 of support tray 422. Wheel wedge 485 assists in centering and stabilizing a bicycle wheel in bicycle tray 422.

As described above, a variety of mechanisms may be employed for limiting the travel of shuttle 440 along rack arm 412. In one example, end panels 497 may be positioned at or proximate to second position 496 of rack arm 412 for arresting travel of shuttle 440 along direction 452 thereat. In other embodiments, however, bolts, pins, or other structures may be used to limit the extent of travel of shuttle 440 along rack arm 412, both at first and second locations 494, 496.

Figure 12:
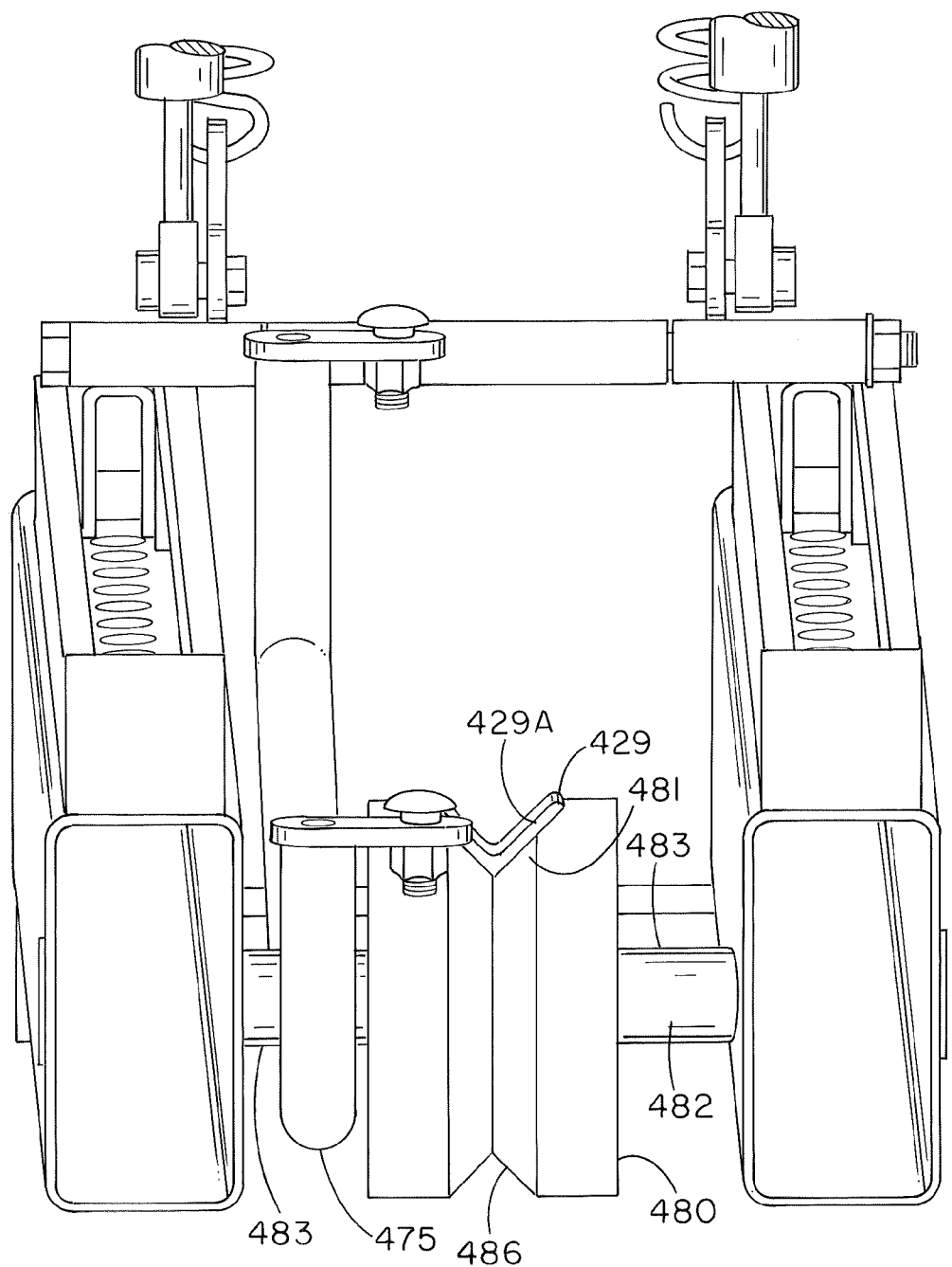
FIG. 12 is a detailed perspective view of a portion of the bicycle rack illustrated in FIGS. 8-11.

Another aspect of the present invention is illustrated in FIG. 12, wherein substantially v-shaped track 429 extends along lower surface of support tray 422. Such track 429 may be operably engagable with a coordinating channel 486 in pivot member 480. Support tray 422 is removed from FIG. 12 for clarity purposes. Coordination between track 429 and channel 486 may assist in guiding support tray 422 along a relatively straight path in its movement along directions 452, 454 with respect to first rack arm 412. In one embodiment, v-shaped track 429 may extend only partially along lower surface of support tray 422 and particularly not extend completely to an end 427 of tray 422. In such a manner, operable placement of support tray 422 in storage position 492 causes v-shaped track 429 to travel along direction 454 beyond an upper tangent point 481 of pivot member 480. Thus, an end surface 429A of v-shaped track 429 may operably abut pivot member 480 to act as a retention surface inhibiting undesired movement of support tray 422 along direction 452 from a storage position 492. Preferably, an intended force placed upon support tray 422 to move support tray 422 along direction 452 will overcome the resistance to such movement generated by end surface 429A of track 429 against pivot member 480. In one aspect, the user may more readily overcome such resistance to movement along direction 452 by slightly lifting the end of support tray 422 to thereby disengage surface 429A from pivot member 480, and to thereafter pull support tray 422 along direction 452 to reengage v-shaped track 429 at, for example, an upper tangent point 481 of pivot member 480.

FIG. 12 further illustrates a bracket 475 extending from lower surface of support tray 422. Bracket 475 may be configured for operable engagement with spindle 482. In one embodiment, relatively low friction bushings 483 may be disposed about spindle 482 to facilitate slidable engagement between bracket 475 and spindle 482. Such bushings 483 may be fabricated from, for example, a relatively high density polymer material that exhibits a relatively low surface friction. Bracket 475 may be provided to limit the extent to which bicycle support tray 422 may be lifted by the user. Preferably, bracket 75 enables enough lifting of support tray 422 to accomplish the disengagement of surface 429A from pivot member 480, as described above. However, bracket 475 preferably limits such lifting to substantially maintain engagement between support tray 422 and rack arm 412. Bracket 475 may be secured to support tray 422 through welding, fasteners, or the like.

Figure 13:
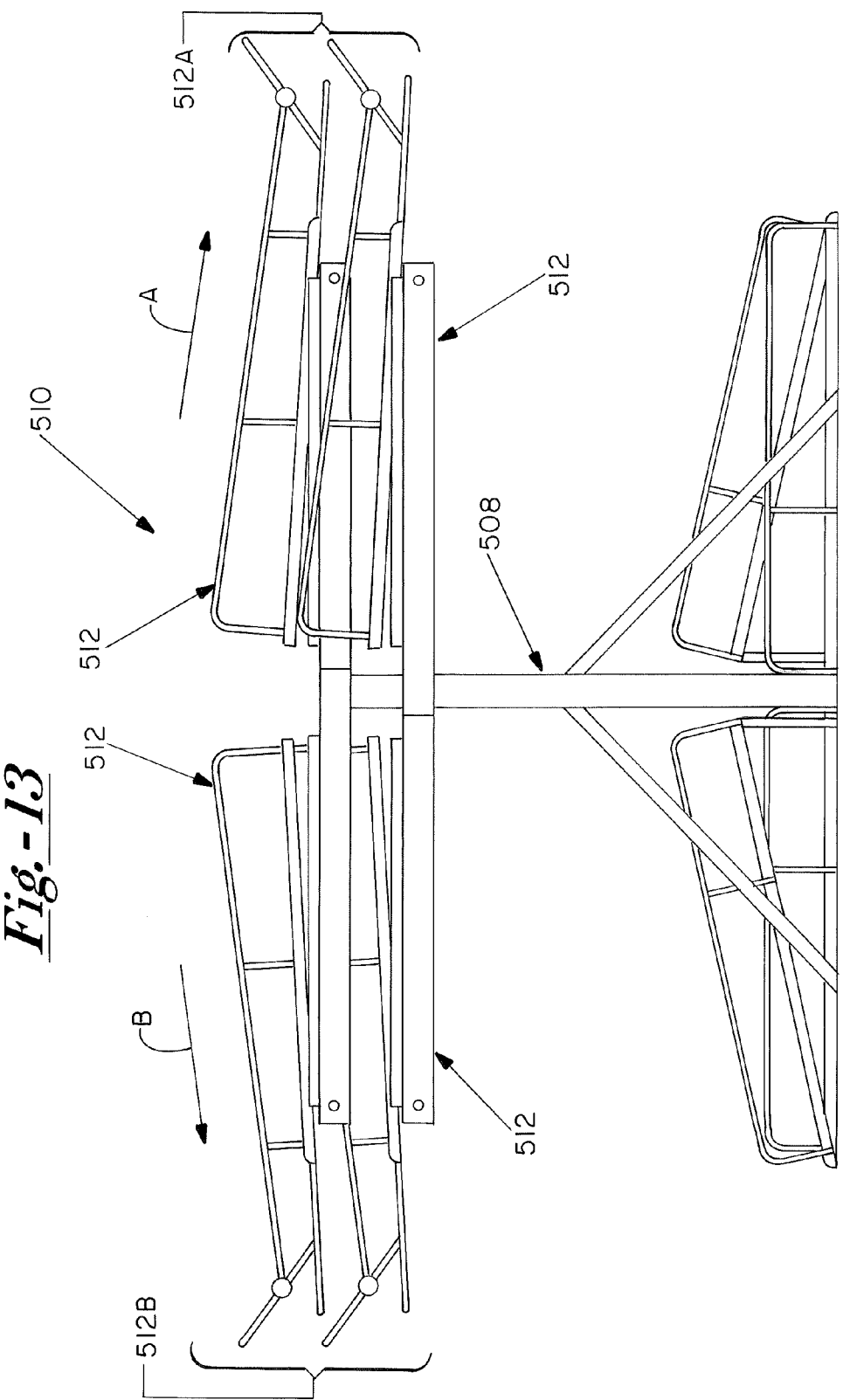
FIG. 13 is a side elevational view of a bicycle rack of the present invention.

An additional embodiment of the present invention is illustrated in FIG. 13, wherein bicycle rack 510 includes a plurality of rack arms 512 extending from support structure 508 in an elevated position in a ground or floor surface, as described above with reference to the other illustrated embodiments. Bicycle rack 510 includes certain of the rack arms 512A which extend from support structure 508 along a direction "A" that is different from the direction that rack arms 512B extend from support structure 508. In the illustrated embodiment, directions "A" and "B" are opposed to one another. In other embodiments, however, directions "A" and "B" may be in any relative orientation, as desired per application.

Bicycle rack 510 is constructed where sets of, for example, bicycles may be stored in end-to-end relationship to maximize bicycle storage concentration in a given area. As indicated above, it is contemplated that a variety of respective orientations for the rack arms 512A and 512B, including additional sets of rack arms extending from bicycle rack 510, may be utilized. In other aspects, rack arms 512 may be similar to the rack arms described above with reference to other embodiments. It is to be understood that the bicycle racks of the present invention may utilize any desired number of rack arms, such as rack arms 512 extending in an elevated position from the corresponding support structure.

The bicycle racks described herein may be fabricated from a variety of materials. Certain materials may be desirable for durability, strength, and corrosion-resistance properties. Example materials useful in the bicycle racks of the present invention include galvanized steel, stainless steel, aluminum, and polymeric materials. In some cases, one or more materials may be utilized in the construction of various components of the bicycle racks of the present invention.

The invention has been described herein in considerable detail in order to comply with the patent statutes, and to provide those skilled in the art with the information needed to apply the novel principles and to construct and use embodiments of the invention as required. However, it is to be understood that the invention can be carried out through different embodiments, and that various modifications can be accomplished without departing from the scope of the invention itself.

What is claimed is:

1. An articulatable bicycle rack, comprising:
    (a) a rack arm having first and second ends defining a length therebetween, said first end being coupled to a support structure in a first orientation so that said rack arm is in an elevated position;
    (b) a shuttle movably engaged along said length of said rack arm;
    (c) a pivot member fixedly secured to the second end of said rack arm;
    (d) a bicycle support tray coupled to said shuttle by a damping device, said tray being articulatable about said pivot member, and said damping device being capable of being actuated as the bicycle support tray is articulated about the pivot member; and
    (e) a bracket coupled to the bicycle support tray, the bracket configured to engage an underside of said pivot member;
    wherein said tray includes a substantially v-shaped track which is operably engagable with a coordinating channel in said pivot member.

2. An articulatable bicycle rack as in claim 1 wherein said tray articulates about said pivot member while said shuttle is moved along said rack arm.

3. An articulatable bicycle rack as in claim 2 wherein said tray is articulatable up to about 90 degrees about said pivot member.

4. An articulatable bicycle rack as in claim 1 wherein said tray is supported by said pivot member.

5. An articulatable bicycle rack as in claim 1 wherein said pivot member is rotatably coupled to said rack arm.

6. An articulatable bicycle rack as in claim 1 wherein said support structure is a rack stand.

7. An articulatable bicycle rack as in claim 1 wherein said damping device is coupled to a first end of said tray.

8. An articulatable bicycle rack as in claim 1, including a vertically offset second rack arm, said second rack arm being coupled to a second support structure in a second orientation substantially parallel to said first orientation, said second rack arm supporting a second bicycle support tray that is articulatable about a second pivot member coupled to said second rack arm.

9. An articulatable bicycle rack as in claim 1 wherein said bracket is secured to a bottom surface of said bicycle support tray and the bracket is configured to engage a coordinating channel on the underside of said pivot member.

10. An articulatable bicycle rack as in claim 1 further comprising a latch hook coupled to said bicycle support tray near the first end of said bicycle support tray, the latch hook being capable of retaining a bicycle to said bicycle support tray.

11. An articulatable bicycle rack as in claim 1 wherein said tray is articulatable about said pivot member to an angle of 70 degrees or more from a horizontal ground surface.

12. An articulatable bicycle rack as in claim 1 wherein said damping device is capable of being actuated to
    (i) reduce the rate of descent of the bicycle support tray when the bicycle support tray is articulated from a storage position to a loading and unloading position, and
    (ii) reduce the force needed to move the bicycle support tray when the bicycle support tray is articulated from a loading and unloading position to a storage position.

13. A bicycle rack, comprising:
    a rack arm coupled to a support structure in a position elevated above a surface, said rack arm having first and second ends defining a length therebetween;
    a bicycle support tray being configured to operably support a bicycle, said bicycle support tray having first and second opposed end portions substantially corresponding to said first and second ends of said rack arm;
    a shuttle movably engaged to said rack arm for travel along substantially an entirety of said length, said shuttle being coupled to said first end portion of said bicycle support tray to facilitate movement of said bicycle support tray with respect to said rack arm;
    a pivot member disposed near a second end of said rack arm and operably supporting said bicycle support tray, wherein said bicycle support tray includes a substantially v-shaped track which is operably engagable with a coordinating channel in said pivot member;

a bracket secured to a bottom surface of said bicycle support tray, the bracket configured to engage a coordinating channel on the underside of said pivot member; and a damping device secured between said shuttle and said first end portion of said bicycle support tray, said damping device being capable of facilitating pivotal movement of said bicycle support tray about said pivot member.

14. A bicycle rack as in claim 13 wherein said bicycle support tray is articulatable up to about 90° about said pivot member.

15. A bicycle rack as in claim 13 wherein said rack arm is elevated above said surface by at least one meter.

16. A bicycle rack as in claim 13 wherein said shuttle is pivotally coupled to said first end portion of said bicycle support tray.

17. A bicycle rack as in claim 13 wherein a top surface of the bracket includes a substantially v-shaped portion engagable with a coordinating channel on the underside of said pivot member.

18. A bicycle rack as in claim 13 wherein said damping device is a gas damper that is tunable to provide a desired rate of descent of the bicycle support tray.

19. A bicycle rack as in claim 13 further comprising a latch hook coupled to said bicycle support tray near the first end of said bicycle support tray, the latch hook being capable of retaining a bicycle to said bicycle support tray.

20. A bicycle rack as in claim 13 wherein said tray is articulatable about said pivot member to an angle of 70 degrees or more from a horizontal ground surface.

\* \* \* \* \*